United States Patent Office 3,070,743
Patented Dec. 25, 1962

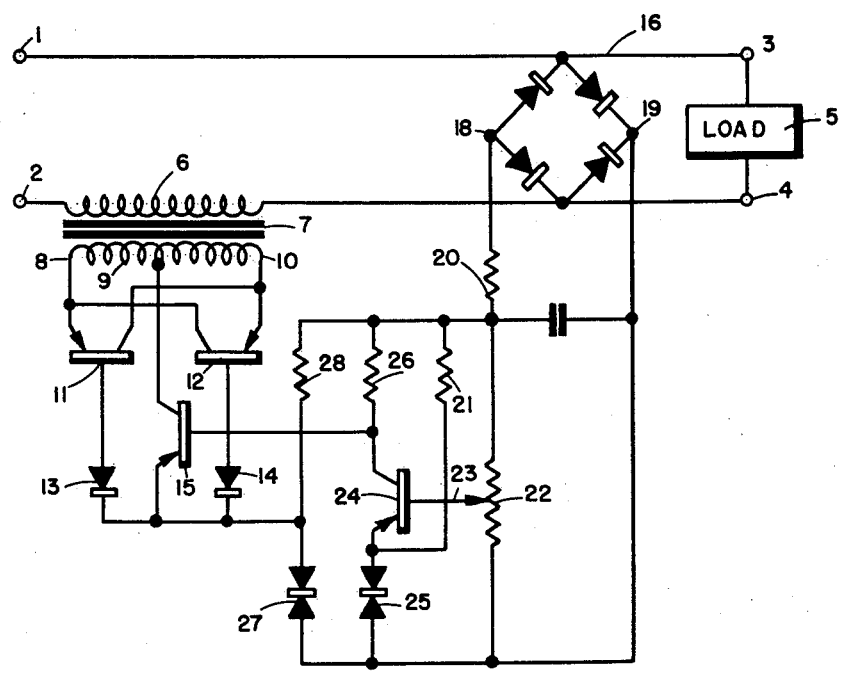

3,070,743
ALTERNATING CURRENT LINE VOLTAGE
REGULATOR
Robert W. Harper, Whittier, Calif., assignor to
North American Aviation, Inc.
Filed Sept. 9, 1958, Ser. No. 759,942
7 Claims. (Cl. 323—66)

This invention relates to voltage regulator circuits and more particularly to a transistorized circuit for controlling the supply current from an alternating current source to a load to minimize changes in the load voltage.

Precision voltage regulating devices are well known and are used extensively in circuits which require minimum changes in load voltage. The purpose of voltage regulation is to keep the voltage supply to the load constant for changes in load current or changes in input voltage, both of which tend to change the output voltage. It is conventional in alternating current voltage regulation to employ a regulating device in series with a load and a source to control the flow of current therethrough by applying a regulating signal proportional to the change in load voltage or line voltage to control the regulating device tending to cause it to vary the current supplied to the load in accordance therewith. Typical regulating devices connected in series between an A.-C. source and a load are saturable reactors and vacuum tubes. A saturable reactor may be utilized to provide efficient and accurate control of the alternating current voltage across a load. However, due to the inherent nature of a saturable reactor wave form distortion which tends to provide an undesirable voltage is always present in the output voltage supplied by the saturable reactor to the load. In addition, vacuum tubes and saturable reactors are not capable of producing the precision regulation often required.

The present invention contemplates a transistorized alternating current voltage regulator utilizing the principles of series type regulation to provide precision voltage regulation. A transformer is provided having a primary winding connected between an alternating current source and a load and having a secondary winding which is connected across a pair of parallel current paths providing current flow in the secondary winding. Means are provided for producing a direct current voltage continuously proportional to the alternating voltage across the output terminals. This voltage is compared with a constant reference D.-C. voltage and the difference is applied to the control electrode of an electronic valve which in turn controls the current through a pair of electronic valves which are reversely connected across the secondary winding to provide a pair of current paths for positive and negative half cycles of operation. A change in line voltage is reflected on the control electrode of the sensing electronic valve which in turn controls the control electrodes of the electronic valves in the current paths. The impedance of the electronic valves reversely connected across secondary winding is directly proportional to the voltage produced by the controlling transistor and provides a variable impedance load to the secondary winding. This variable impedance load is reflected to the primary winding which causes the current between the source and the load to vary in accordance with the difference voltage tending to maintain the alternating voltage across the load substantially constant.

It is therefore an object of this invention to provide an alternating current voltage regulator with improved operating characteristics.

It is another object of this invention to provide an improved transistorized alternating current voltage regulator.

It is still another object of this invention to provide an alternating current voltage regulator having a transformer with a primary winding in series between a source and a load and means for controlling the current through the primary winding in accordance with the deviation of the voltage across the load from a predetermined reference level.

It is a further object of this invention to provide an alternating current voltage regulator independent of frequency changes in the circuit.

It is a still further object of this invention to provide an alternating current voltage regulator with improved ripple characteristics.

Other objects of this invention will become apparent from the fo lowing description taken in connection with the accompanying drawing which is a schematic diagram illustrating the invention.

Referring now to the drawing, a circuit diagram of an alternating current voltage regulator embodying the invention is shown. In the drawing unregulated alternating current voltage is supplied to the regulator input terminals 1 and 2 from a source (not shown). The voltage received at terminals 1 and 2 is supplied to output terminals 3 and 4 which are connected across a suitable load 5. Connected in series between one of the input terminals, for example, 2, and one of the output terminals, for example, 4, is the primary winding 6 of transformer 7. Secondary winding 9 of transformer 7 has one terminal 8 connected to the emitter of P-N-P transistor 11 and the other terminal 10 connected to the emitter of P-N-P transistor 12. Terminal 8 is also connected to the collector of transistor 12 and terminal 10 is also connected to the collector of transistor 11. Thus, the emitter-collector circuit of transistor 11 provides a current path across secondary winding 8 for one half cycle of operation and the reversely connected emitter-collector circuit of transistor 12 provides a current path across secondary winding for the other half cycle of operation. The bases of transistor 11 and transistor 12 are connected through diodes 13 and 14 respectively to the emitter of transistor 15. Diodes 13 and 14 have their respective anodes connected to the bases of transistors 11 and 12 and their cathodes connected in common to the emitter of P-N-P transistor 15. Diodes 13 and 14 operate to prevent excessive back bias voltages from being impressed on the bases of transistors 11 and 12 during the half cycles of nonconduction. The collector of transistor 15 is connected to the midpoint of secondary winding 9. The emitter-collector circuit of transistor 15 furnishes an alternating current path for the emitter-base circuits of transistors 11 and 12.

A source of D.-C. voltage of magnitude proportional to the magnitude of the alternating output voltage across load 5 is provided by means of a rectifier comprising full wave rectifier 16 which has two input terminals connected to output terminals 3 and 4 of the regulator and two output terminals 18 and 19 providing a D.-C. voltage proportional to the A.-C. voltage across load 5. A bridge comparison circuit comprising resistors 20, 21, 22 produces a potential at wiper 23 proportional to the voltage across terminals 18 and 19. Wiper 23 is connected to the base of P-N-P transistor 24. Transistor 24 has its emitter connected through zener diode 25 to the positive side of output terminal 19 and its collector connected through resistor 26 to the negative or ground terminal 18. Transistor 24 operates to sense the voltage produced at wiper 23 which is proportional to the voltage at the output of rectifier 16. A potential at the base of transistor 24 is compared to the reference potential established by zener diode 25 on the emitter of transistor 24 and the current flowing in the collector of transistor 24 is proportional to this voltage. The collector of transistor 24 is connected to the base of transistor 15. Zener diode 27 and resistor 28 connected between the positive side of rectifier 16 and ground have their midpoint connected in common to the emitter of transistor 15 and the cathodes of diodes 13 and 14 to establish a reference potential on the emitter of transistor 15 and on the bases of transistors 11 and 12 through diodes 13 and 14 respectively.

In operation the load current flowing through primary winding 6 of transformer 7 induces a voltage in secondary winding 9. Transistors 11 and 12 are reversely connected to conduct in opposite directions, with the voltages on the bases of transistors 11 and 12 with respect to their emitters controlling the impedance that the respective transistors offer to the flow of current through secondary winding 9. A more negative potential on either base of transistors 11 and 12 with respect to its emitter will reduce the alternating current flowing in secondary winding 9 and therefore will raise the voltage drop across secondary winding 9. An increase in voltage drop across secondary winding 9 is reflected to primary winding 6 which, in series with the line, decreases the alternating output voltage across terminals 3 and 4. The potential applied to the bases of 11 and 12 is controlled by the flow of current through transistor 15. An increase in the flow of current through transistor 15 increases the voltage between the emitter and base of both transistor 11 and transistor 12, which in turn increases the flow of current through the emitter-collector circuits and secondary winding 9 which is reflected to primary winding 6 which increases in current flow. Thus, it may be seen that the potential controlling the voltage drop across primary winding 6 is derived from the controlling transistor 15.

Another way of visualizing the operation of the circuit is to conceive of secondary winding 8 as reflecting into primary winding 6 a variable impedance comprising alternately the emitter-collector impedance of transistors 11 and 12 on respective half cycles. The reflected impedance will vary with the voltage applied to the bases of transistors 11 and 12. Thus, for example, an increase in potential across load 5 over the desired voltage is reflected by rectifier 16 to the bridge comparison circuit of resistors 20, 21, and 22, and thereby to wiper 23. The voltage between the emitter (at a reference potential established by zener diode 25) increases causing an increase in current in the collector of transistor 24. The voltage across resistor 26 increases thereby decreasing the voltage at the base of transistor 15 with respect to the emitter (at a reference potential established by zener diode 27). The current in the collector of transistor 15 decreases thereby decreasing the voltage between the base and emitter of both transistor 11 and transistor 12. The current through transistors 11 and 12 correspondingly decreases resulting in an increase in effective impedance across the emitter-collectors of transistors 11 and 12. This increase in impedance is reflected by secondary winding 8 through primary winding 6 thereby increasing the voltage drop across winding 6 which tends to reduce the voltage across load 5 to normal. Similar operation occurs for an initial decrease in potential across load 5.

Several modifications to the circuit shown in the drawing are readily apparent. P-N-P transistor 24 could be replaced by an N-P-N transistor with circuit changes well known in the art. Likewise, P-N-P transistors 11, 12, and 15 could be N-P-N transistors. The sensing circuit comprising rectifier 16, the bridge circuit, and transistor 24 could also be replaced by any equivalent circuit which produces a direct current voltage proportional to the alternating current voltage across the load.

By utilizing transistors in the circuit greater efficiency of control is obtained than is known in the art. For example, the low base current provided by transistor 15 decreases the direct current saturation voltage across the transistor to an insignificant amount. Known circuits utilizing vacuum tubes have appreciable inefficiency due to D.-C. saturation voltage. Likewise, greater accuracy is obtained by having transistors 11 and 12 connected as shown because of the fact that the voltage between the emitter and base of the conducting one of transistors 11 and 12 is practically negligible, thus reducing the saturation voltage to a minimum. Other advantages inherent in the operation of transistors contribute to the overall improvement of the circuit.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In an alternating current voltage regulator having a pair of input terminals connected to receive a source of alternating current and a pair of output terminals connected across a load and having a transformer with a primary and a secondary winding, said primary winding connected in series between one of said input terminals and one of said output terminals, said secondary winding having two end terminals and a centertap terminal, the combination of first and second transistors of equal types reversely connected in parallel across said secondary winding end terminals, the emitter-collector path of one of said transistors connected to form a first current path across said secondary winding during positive half cycles of conduction, the emitter-collector path of the other said transistor connected to form a second current path across said secondary winding during negative half cycles of conduction, a third transistor having its emitter-collector path connected in common between the bases and emitters of said first and second transistors including said centertap terminal, and regulating means for impressing upon the emitter with respect to the base of said third transistor a potential having variations corresponding to A.-C. load voltage changes for controlling the current supplied through said secondary winding.

2. The combination in claim 1 wherein is included means connected in series between the bases of said first and second transistors and the emitter of said third transistor to block the flow of current in the base of said first transistor during one half cycle of conduction and to block the flow of current in the base of said second transistor during the other half cycle of conduction.

3. The combination in claim 1 wherein said regulating means comprises means for producing a D.-C. voltage continuously proportional to the alternating voltage across said output terminals, means for providing a constant reference D.-C. voltage, a fourth transistor having its base connected to receive a signal proportional to the difference between said reference and said proportional voltage, and having its collector connected to present a signal to the base of said third transistor proportional to said difference voltage.

4. Means for supplying current from an alternating current source to a load comprising a transformer having primary and secondary windings, said primary winding connected in series between said source and said load, first said secondary winding having a centertap terminal thereon, and second transistors of equal types each having at least a collector, an emitter, and a base, the emitter-collector path of said first transistor connected across said secondary winding to form a first current path for positive half cycles of conduction, the emitter-collector path of said second transistor connected across said secondary winding to form a second current path across said secondary winding for negative half cycles of conduction, a third transistor having at least a collector, an emitter, and a base, the emitter-collector circuit of said third transistor connected to said centertap terminal to provide a bias potential on the bases of said first and second transistors relative to the emitters of said first and second transistors respectively, means for impressing upon the base of said third transistor a potential having variations corresponding to A.-C. load potential changes.

5. The combination of claim 4 wherein is included unidirectional conductive means in the connections of said emitter collector circuit to the bases of said first and second transistors for preventing flow of current in said first and second transistors during alternate cycles of operation.

6. In an alternating current voltage regulator having a pair of input terminals connected to receive a source of alternating current and a pair of output terminals connected across a load, and having a transformer with primary and secondary windings, said primary winding connected in series between one of said input terminals and one of said output terminals, said secondary winding having two end terminals and a centertap terminal, the combination of first and second transistors each having a collector, an emitter, and a base, the emitter-collector circuit of one of said transistors connected across said secondary winding end terminals to provide a variable impedance current path for positive half cycles of operation, the emitter-collector of the other of said transistors connected across said secondary winding end terminals to provide a variable impedance current path for negative half cycles of operation, means for producing a D.-C. voltage continuously proportional to the alternating voltage across said output terminals, means for providing a constant reference D.-C. voltage, means for amplifying the difference between said reference and said proportional voltages, a third transistor having at least a collector, an emitter, and a base, means for connecting the emitter-collector of said third transistor connected to said centertap terminal of said secondary winding to form a common alternating-current path between the bases and emitters of said first and second transistors, the base of said third transistor connected to receive the output of said amplifying means whereby the impedance presented by said first and second transistors to the secondary of said transformer may be caused to vary in accordance with said amplified difference voltage to maintain the alternating voltage across said output terminals substantionally constant.

7. In an alternating current voltage regulator the combination of a source of alternating current potential, a load, a transformer having primary and secondary windings, said secondary winding having two end terminals and a centertap terminal, said source, said primary winding, and said load being connected in series circuit relationship, a first transistor having at least an emitter, a base, and a collector, the emitter-collector path of said first transistor connected across said secondary winding end terminals to provide a current path for positive half cycles of operation, a second transistor having at least a collector, an emitter, and a base, the emitter-collector path of said second transistor connected across said secondary winding end terminals to provide a variable impedance current path for negative half cycles of operation, a third transistor having at least an emitter, base, and a collector, the emitter of said third transistor connected in common to the bases of said second transistor and the collector of said third transistor connected to ground, the emitter-collector of said third transistor connected to said centertap terminal of said secondary winding to provide a variable impedance path for the bases of said first and second transistor, means for deriving a controlling potential proportional to the potential across said load, the base of said third transistor connected to be responsive to the output of said control means to provide a variable impedance path to the bases of said first and second transistors thereby causing changes in the impedance of said first and second transistors in accordance with said control voltage.

References Cited in the file of this patent
UNITED STATES PATENTS

| 2,392,434 | Trucksess | Jan. 8, 1946 |
| 2,514,935 | Clapp | July 11, 1950 |
| 2,562,744 | Schultz | July 31, 1951 |
| 2,638,571 | Schultz | May 12, 1953 |
| 2,698,416 | Sherr | Dec. 28, 1954 |
| 2,878,440 | Jones | Mar. 17, 1959 |
| 2,903,640 | Bixby | Sept. 8, 1959 |

OTHER REFERENCES

"Duality as a Guide in Transistor Circuit Design," Wallace and Raisbeck, The Bell System Technical Journal, April 1951, vol. 30, American Telephone and Telegraph Co., New York, pp. 381–417.

UNITED STATES PATENT OFFICE

CERTIFICATE OF CORRECTION

Patent No. 3,070,743                      December 25, 1962

Robert W. Harper

It is hereby certified that error appears in the above numbered patent requiring correction and that the said Letters Patent should read as corrected below.

Column 4, line 62, strike out "first", and insert the same after the comma in line 63, same column 4.

Signed and sealed 12th day of November 1963.

(SEAL)
Attest:

ERNEST W. SWIDER                      EDWIN L. REYNOLDS

Attesting Officer            Acting    Commissioner of Patents